Figure 6:
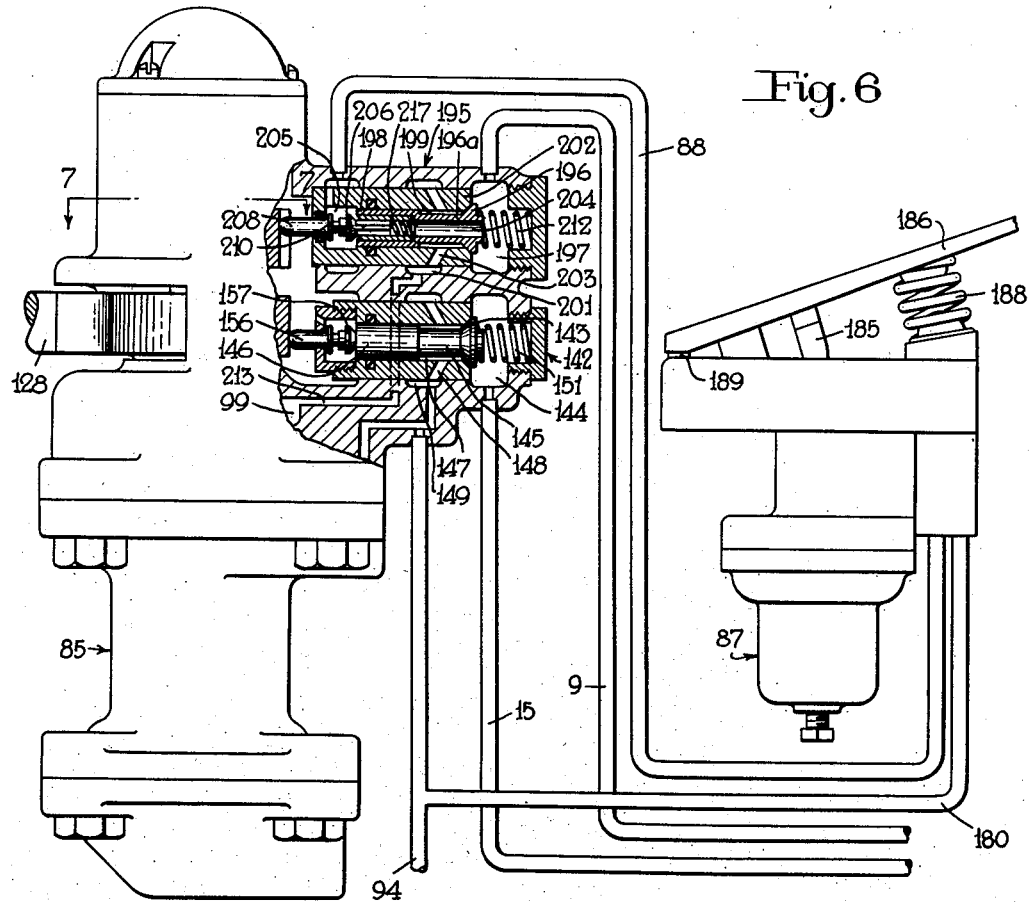

June 20, 1950  S. G. DOWN  2,512,013
TWO STATION CONTROL OF FLUID MOTORS
Filed Jan. 17, 1946  3 Sheets-Sheet 1
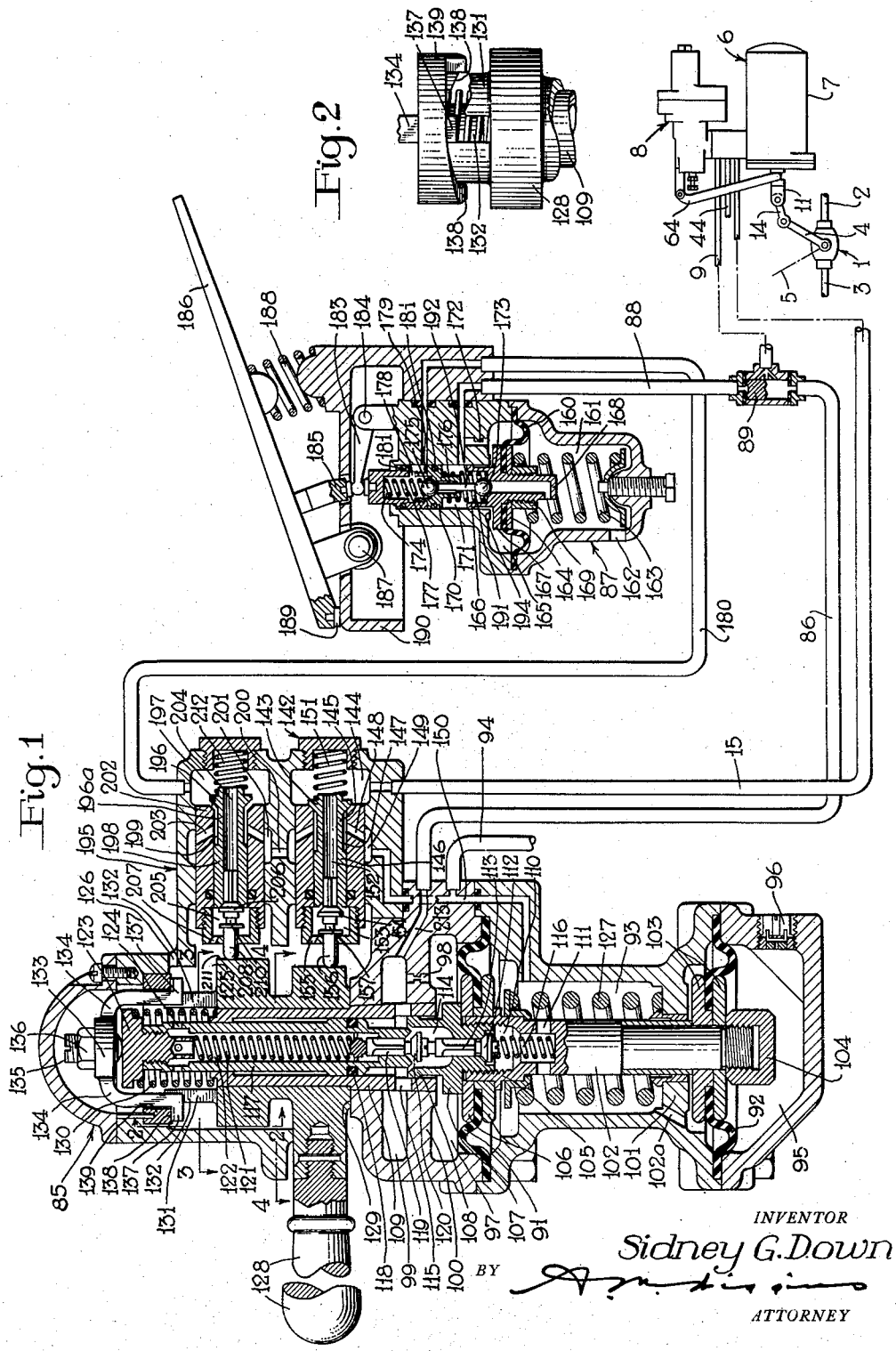
INVENTOR
Sidney G. Down
BY
ATTORNEY

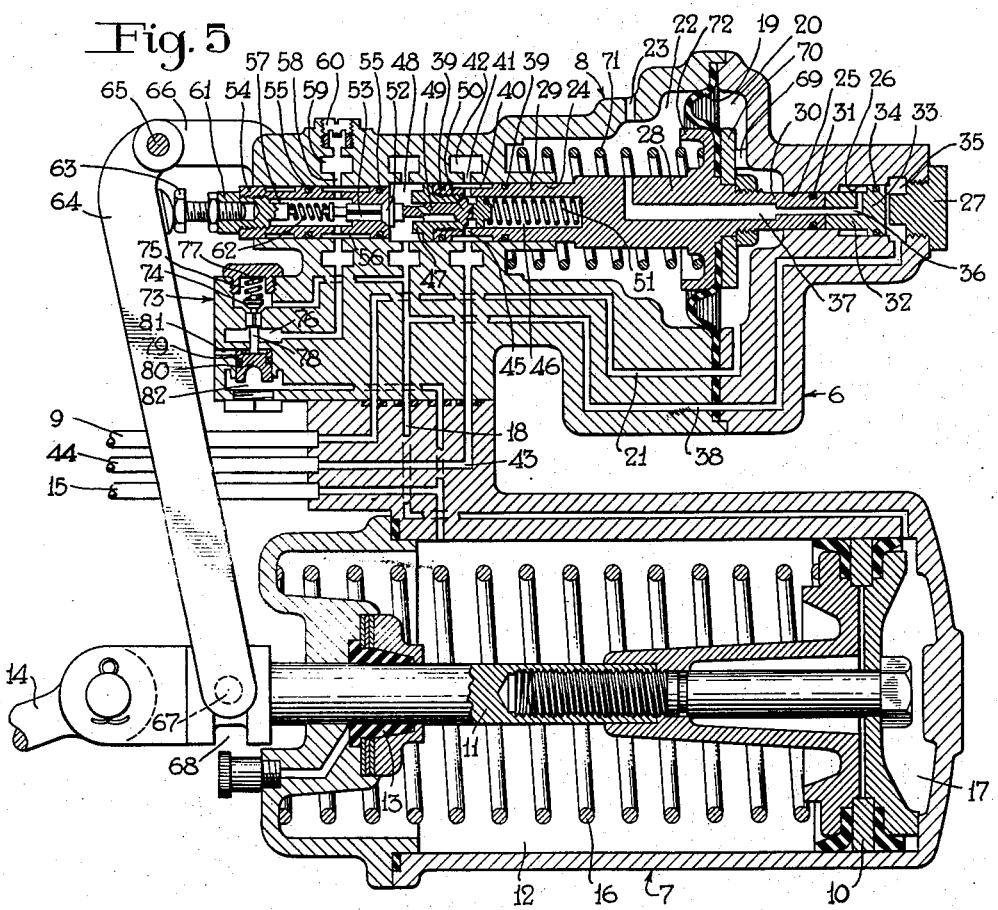
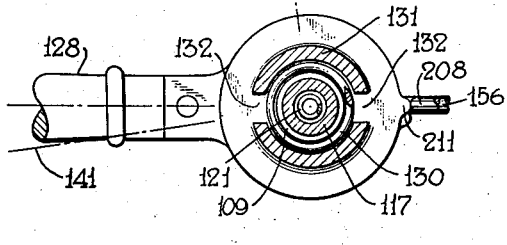
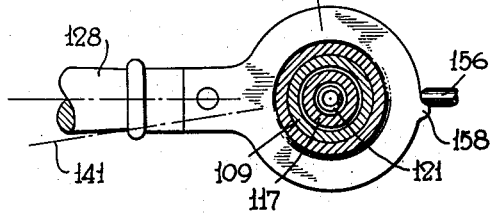

June 20, 1950   S. G. DOWN   2,512,013
TWO STATION CONTROL OF FLUID MOTORS
Filed Jan. 17, 1946   3 Sheets-Sheet 3

INVENTOR
Sidney G. Down
BY
ATTORNEY

Patented June 20, 1950

2,512,013

UNITED STATES PATENT OFFICE 2,512,013

TWO STATION CONTROL OF FLUID MOTORS

Sidney G. Down, Edgewood, Pa., assignor to The Westinghouse Air Brake Company, Wilmerding, Pa., a corporation of Pennsylvania Application January 17, 1946, Serial No. 641,807

8 Claims. (Cl. 121—38)

This invention relates to fluid pressure control apparatus for controlling engine throttles and more particularly to the type for controlling throttles on steam locomotives.

On steam locomotives it has heretofore been proposed to employ a fluid pressure motor for adjusting the throttle valve which regulates the supply of steam for propelling the locomotive, and both a hand operated and a foot operated control device, selectively operable by the engineer, have been provided to control the pressure of fluid for controlling said motor.

The hand operated control device was provided particularly for use when the locomotive was operating on a long run, requiring a substantially constant flow of steam for propulsion, since it could be adjusted to the required position in which it would then automatically remain.

The foot operated control device however was provided particularly for use in yard service where starting and stopping of the locomotive is usually very frequent as in transferring a train, car by car, over a scale for weighing, or as in making up trains. Further, when an engineer has to watch out of the locomotive cab window for signals from either the front or rear of the locomotive and then shift the locomotive accordingly in either one direction or in the opposite direction, and which type of operation may continue for long periods of time in yard service, the foot operated control device is particularly useful in that the engineer does not have to twist around into the cab to operate it, as he would to use the hand operated control device which is usually located convenient to the engineer when sitting for forward movement of the locomotive. The foot operated control device thus provides for easier and more prompt operation of the locomotive and minimizes fatigue to the engineer in yard service.

If desired, however, the engineer may use the hand operated control device in yard service, or the foot operated control device on long runs. The foot operated control valve device is such however as to require foot pressure to supply steam to propel the locomotive and which automatically operates to cut off steam upon removal of foot pressure, so that during a long run it might become very tiresome. The hand operated control device is therefore usually preferred for use on a long run.

When the hand operated control device is adjusted to supply steam for propelling the locomotive on a long run, it is undesirable however to have interference from the foot operated control device by accidentally subjecting it to foot pressure, and the principal object of the invention is therefore to provide an improved throttle control apparatus embodying means for preventing such interference.

Other objects and advantages will be apparent from the following more detailed description of the invention.

Figure 7:
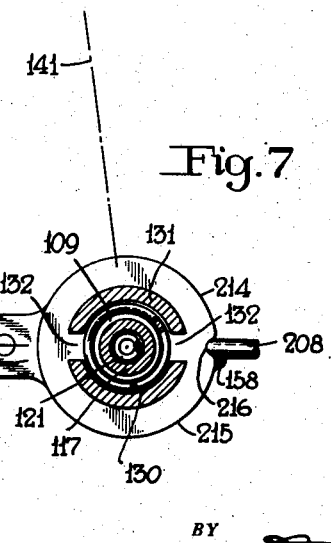

In the accompanying drawings; Fig. 1 is a diagrammatic view, mainly in section, of a throttle control apparatus embodying one form of the invention; Figs. 2, 3 and 4 are sectional views taken on lines 2—2, 3—3, and 4—4, respectively, on a hand operated control device shown in vertical section in Fig. 1; Fig. 5 is a sectional view of a throttle control device shown in elevation in Fig. 1; Fig. 6 is a view similar to a portion of Fig. 1 but embodying another form of the invention; and Fig. 7 is a sectional view taken on line 7—7 in Fig. 6.

Description Figs. 1 to 5

In the drawings, the reference numeral 1 indicates an adjustable engine throttle valve device for regulating flow of power fluid, such as steam, from a pipe 2 to a pipe 3. The pipe 2 may be supplied with steam from a locomotive boiler (not shown), while the pipe 3 may be arranged to convey steam supplied thereto to locomotive driving means (not shown) for propelling the locomotive. The throttle valve device 1 is operable to regulate or vary the amount of steam supplied to pipe 3 in accordance with the adjustment of a lever 4 to and between a throttle closed or power-off position in which it is shown in the drawing, and a fully open or maximum power position, such as indicated by a dot-dash line 5.

A throttle control motor 6 is provided which comprises a power portion 7 for adjusting the throttle control lever 4, and a pilot portion 8 for regulating the operation of the power portion 7 in accordance with pressure of fluid in a control pipe 9.

As shown in Fig. 5 of the drawings, the power portion 7 of the throttle control motor comprises a casing containing a double acting piston 10 having a rod 11 extending through a pressure chamber 12 and a suitable packing gland 13 in the casing wall to the exterior of the casing. The outer end of the piston rod 11 is operatively connected by a suitable link 14 to the end of lever 4 of the throttle valve device 1.

The pressure chamber 12 at one side of the power piston 10 is connected to a power cut-off pipe 15 and contains a spring 16 acting on said piston for urging same in the direction of the right hand to a steam cut-off position in which it is shown in the drawings. At the opposite side of the power piston 10 is a control chamber 17 which is connected by a passage 18 to the pilot portion 8.

The pilot portion 8 of the throttle control motor 6 is provided for controlling through passage 18 the supply and release of fluid under pressure to and from power chamber 17 for varying the position of power piston 10 in accordance with the pressure of fluid provided in the control pipe 9, and to this end comprises a casing containing a flexible diaphragm 19 at one side of which is a pressure chamber 20 connected through a passage 21 to said control pipe. At the opposite side of diaphragm 19 is a chamber 22 which is open to atmosphere through a passage 23. The casing is provided with bores 24 and 25 at opposite sides of and coaxially aligned with the diaphragm 19. One end of bore 24 is open to chamber 22. The adjacent end of bore 25 is open to chamber 20 while its opposite end is open to a larger bore 26 the outer end of which is closed by a cap nut 27.

A stem 28 extending centrally through the diaphragm 19 and secured thereto for movement therewith has one end portion 29 disposed to slide in the adjacent end portion of bore 24, while its opposite end portion 30 is mounted to slide in bore 25. The portion 30 of stem 28 is provided near its end with an annular recess in which there is disposed a sealing ring 31 having sealing and sliding contact with the wall of bore 25 for preventing leakage of fluid under pressure from chamber 20. The end portion 30 of stem 28 engages the smaller end portion of a plunger 32, the larger end portion 33 of which is disposed to slide in bore 26. In this larger portion 33 of plunger 32 is an annular groove carrying a sealing ring 34 having sliding and sealing contact with the wall of bore 26 to prevent leakage of fluid under pressure from a chamber 35 at its outer face to the space between said ring and the sealing ring 31, this space being constantly open to atmosphere through a passage 36 in plunger 32 and a registering passage 37 which extends through stem 28 to chamber 22. Chamber 35 at the outer end of plunger 32 is open through a passage 38 to passage 18.

The portion 29 of stem 28 which is disposed in bore 24 is provided with two spaced sealing rings 39 having sealing and sliding contact with the wall of said bore to prevent leakage of fluid under pressure past said rings from an annular recess 40 provided in the peripheral surface of said stem between said rings. The recess 40 is open through a plurality of ports 41 to an annular recess 42 in the casing and thence through a passage 43 to a fluid pressure supply pipe 44, which may be charged with fluid under pressure from any suitable source (not shown).

The annular recess 40 is also open through a plurality of ports 45 to a counterbore 46 provided in the portion 29 of stem 28. The open end of counterbore 46 is closed by a plug 47 which is secured to and is movable with stem 28. The plug 47 has an axial bore one end of which is open to a chamber 48 at the end of portion 29 of stem 28, while the opposite end is open to counterbore 46 within said stem, and slidably mounted in this axial bore is a fluted stem 49 projecting from a fluid pressure supply valve 50 contained in said counterbore and arranged to seat against the adjacent end of said plug. A precompressed spring 51 in counterbore 46 acts on the supply valve 50 for urging said valve to the seated or closed position, as shown in Fig. 5.

The end of the supply valve stem 49 extends beyond the outer face of plug 47 into chamber 48 and therein engages a release valve 52 which has a fluted stem 53 slidably mounted in a bore provided axially in a plunger 54 which is mounted to slide in a bore in the casing in coaxial relation with the diaphragm operated stem 28. In the peripheral portion of plunger 54 are two spaced recesses in each of which is a sealing ring 55 having sealing contact with the wall of the casing bore for preventing leakage of fluid under pressure from one side of each ring to the opposite side. Between the two rings 55 the plunger 54 has an annular recess 56 which is open through one or more ports to a bore 57 in the plunger and into which bore the end of the release valve stem 53 projects. The recess 56 is also open through one or more ports 58 in the casing to an annular recess 59 which is in constant communication with atmosphere through an insect excluding fitting 60.

The outer end of the bore in plunger 54 is closed by a plug 61 and between the inner end of said plug and the adjacent end of the release valve stem 53 is interposed a precompressed spring 62 for urging the release valve 52 out of seating engagement with the end of plunger 54. In the outer end of plug 61 is an adjusting screw 63 the end of which bears against a lever 64. One end of lever 64 is mounted to rock on a pin 65 which is mounted in a fixed arm 66 projecting from the casing. The other end of lever 64 is operatively connected to the power piston rod 11 by means of a lug 67 projecting from said lever into an annular groove 68 provided in said rod.

It will be noted that chamber 48 containing the release valve 52 is formed between the adjacent ends of the portion 29 of stem 28 and of plunger 54, and that said chamber is open to passage 18 leading to the power piston chamber 17. Passage 18 is also open to passage 38 leading to chamber 35 at the outer face of plunger 32 as before mentioned, and it is desired to point out that the enlarged portion 33 of said plunger is of the same area as plug 47, whereby pressure of fluid effective in chamber 35 on plunger 32 tending to urge the structure including diaphragm 19 in the direction of the left hand will be counter-balanced by an equal pressure in chamber 48 acting on the plug 47.

Carried by the casing and projecting into chamber 20 at the right hand side of diaphragm 19 is a stop 69 arranged to be engaged by a plate 70 secured to the stem 28 for limiting deflection of said diaphragm in the direction of the right hand. In chamber 22 a control spring 71 encircling the stem 28 bears at one end against the casing, while the opposite end bears against a follower 72 provided on stem 28 and engaging the adjacent face of diaphragm 19. This spring is operative to urge the diaphragm 19 to the position in which it is shown in the drawings upon release of fluid under pressure from chamber 20, and to oppose movement of said diaphragm in the direction of the left hand upon supply of fluid under pressure to said chamber, and to cooperate with such pressure to define different positions of said diaphragm.

Also associated with the casing of the pilot valve device is an insuring valve device 73 comprising a poppet valve 74 contained in a chamber 75 which is open to passage 18. The valve 74 has a fluted stem disposed in a bore connecting chamber 75 to a chamber 76 which is open to atmosphere through the fitting 60, said valve being arranged to control communication between passage 18 and said fitting, like the release valve 52, but under different conditions as will be later brought out. A spring 77 in chamber 75 acts on valve 74 for urging it to closed position.

The fluted stem of valve 74 engages in chamber 76 a stem 78 which extends through a bore in a wall separating said chamber from a chamber 79 provided at one side of a piston 80 to which said stem is connected. Chamber 79 is open to atmosphere through a port 81. At the opposite side of piston 80 is a pressure chamber 82 which is connected to the cut-out pipe 15.

In operation, let it be assumed that pressure of fluid in chamber 20 is at or near atmospheric pressure. Under this condition spring 71 will urge diaphragm 19 and stem 28 to the position shown in Fig. 5, and the supply valve 50 will, as a result, be closed by spring 51. Chamber 48 and the connected chamber 17 at the right hand face of the power piston 10 will, under this condition, be substantially at atmospheric pressure, and the release valve 52 will be seated for reasons which will become apparent from the description to follow.

Thus when diaphragm 19 is in its normal position shown in the drawing the pressure of fluid in the power piston chamber 17 will be so reduced as to permit piston 10 to occupy its power cut off position under pressure of spring 16 for thereby actuating the throttle control device 1 to its power off position for preventing supply of steam to pipe 3.

Let it now be assumed that it is desired to supply steam to pipe 3 for propelling the locomotive. To accomplish this fluid under pressure will be supplied through the control pipe 9 to diaphragm chamber 20 and when this pressure becomes sufficient to overcome the opposing force of spring 71 the diaphragm 19 will be deflected in the direction of the left hand to a position where the increase in pressure of said spring will counterbalance the pressure of fluid in chamber 20. As the diaphragm 19 is thus moved the stem 28 and plug 47 will move relative to and shift said plug out of seating engagement with the supply valve 50, since said valve is held against movement at this time by engagement with the release valve 52 which is also held against movement by plunger 54, lever 64 and a relatively great reluctance to movement of the power piston 10.

Upon opening of the supply valve 50 fluid under pressure from the supply pipe 44 will then flow past said valve to chamber 48 and thence to chamber 17 at the right hand side of the power piston 10. When the pressure of fluid thus obtained in chamber 17 then becomes sufficient to overcome the opposing force of spring 16 and the resistance to movement of the throttle valve device 1, the piston 10 will move in the direction of the left hand.

After movement of diaphragm 19 ceases in a position corresponding to the pressure of fluid provided in chamber 20, movement of the power piston 10 under pressure of fluid provided in chamber 17 will act through lever 64 to allow movement of plunger 54 by pressure of fluid in chamber 48 in a direction away from plug 47, and this movement of said plunger will permit movement of the supply valve 50 by spring 51 toward its seat. The supply valve 50 will finally engage its seat in a position of power piston 12 corresponding to the position of said seat as predetermined by the pressure of controlling fluid provided in chamber 20. When the supply valve 50 is thus closed, flow of fluid under pressure to chamber 48 and to the power piston chamber 17 will stop and hence movement of the power piston will cease in a position corresponding to the pressure of fluid effective in chamber 20.

It will thus be seen that upon supply of fluid to diaphragm chamber 20 the throttle control motor 6 will operate to cause operation of the throttle valve device 1 to supply steam to pipe 3 in an amount proportional to the pressure of such fluid.

If the throttle valve device 1 is operated as just described to provide less than full steam supply to pipe 3, the supply of steam may be increased by increasing the pressure of fluid in diaphragm chamber 20, whereupon the throttle control motor 6 will again operate as just described to correspondingly increase the supply of steam to pipe 3. A maximum pressure of fluid in diaphragm chamber 20 will cause operation of the throttle control lever 4 to its full open or maximum power position indicated by the dot-dash line 5.

On the other hand, if the operator desires to reduce the amount of steam supplied to pipe 3 he will reduce the pressure of fluid in diaphragm chamber 20 to a desired degree. Spring 71 will then move diaphragm 19 in the direction of the right hand to a new position corresponding to the reduced pressure of fluid in chamber 20. As diaphragm 19 is thus moved toward the right hand it will carry with it the supply valve 50 which will be seated under pressure of spring 51, thus rendering spring 62 effective to move the release valve 52 with the supply valve and relative to the plunger 54 and out of seating engagement with said plunger, since said plunger will at this time be held against movement by pressure of fluid in chamber 48. Upon this opening of the release valve 52 fluid under pressure will be released from chamber 48 and thereby from the power piston chamber 17 which will permit spring 16 to move the power piston 10 and lever 4 of the throttle control device 1 in the direction of the right hand. The piston 10 as it is thus moved will operate lever 64 to move plunger 54 in the direction of the release valve 52. After movement of diaphragm 19 and release valve 52 ceases in a position corresponding to the reduced pressure of fluid in chamber 20, this movement of plunger 54 will be relative to said valve and said plunger will finally engage said valve to prevent further release of fluid under pressure from chamber 17 whereupon the power piston 10 and lever 4 will stop in a position corresponding to the reduced pressure of fluid in diaphragm chamber 19. The throttle valve device 1 will thereby be adjusted to reduce the amount of steam supplied to pipe 3 to a degree corresponding to the reduced pressure of fluid in diaphragm chamber 20.

If a further release of fluid under pressure from diaphragm chamber 20 is effected, the power piston 10 will again be caused to operate in the manner just described to effect operation of the throttle valve device 1 to correspondingly reduce the supply of steam to pipe 3. Upon reducing the pressure of fluid in diaphragm chamber 20 to or substantially to atmospheric pressure, the diaphragm 19 and supply valve 50 will be returned to the positions in which they are shown in Fig. 5 under the action of spring 71, whereupon the power piston 10 will also be returned to its cut-off position, in which it is shown in the drawing, to thereby actuate the throttle valve device 1 to its throttle closed or power-off position. As the power piston 10 obtains its cut-off position, the plunger 54 may just move into contact with the release valve 52.

It will now be seen that the throttle valve device 1 will be adjusted to any position between and including its throttle closed or power off position and its fully open or maximum power position, by providing through pipe 9 the proper pressure of fluid in diaphragm chamber 20.

In the above described operation of the throttle control motor 6 it was assumed that spring chamber 12 was open to atmosphere through pipe 15, under which condition movement of the power piston 10 to its power cut-off position will be effected by spring 16.

In order to positively insure that the supply of steam will be cut off to pipe 3 when the parts of the pilot portion 8 of the fluid motor 6 are in the positions in which they are shown in Fig. 5, and when fluid under pressure is released from chamber 17, and particularly in case of breakage of spring 16, fluid under pressure will be supplied to chamber 12 through the cut-off pipe 15, by means to be later described. To insure the release of fluid under pressure from chamber 17 at this time, even though spring 71 acting on diaphragm 19 should become broken or spring 62 acting on release valve 52 should become broken which would prevent opening of the release valve 52, the insuring valve piston 80 will be operated by fluid under pressure supplied to the cut-off pipe 15 to unseat valve 74 to thereby open the power piston chamber 17 to atmosphere through the communication by-passing the release valve 52.

During operation of the throttle adjusting motor 6 for supplying steam to pipe 3 as above described, spring chamber 12 and piston chamber 82 will however be open to atmosphere through the cut-off pipe 15, and as a result the insuring valve 74 will be closed.

Fluid under pressure is adapted to be supplied to and released from diaphragm chamber 20 in the pilot portion 8 of the throttle adjusting motor 6 either by operation of a hand operated throttle control valve device 85 through the medium of a pipe 86, or by operation of a foot operated throttle control valve device 87 through the medium of a pipe 88. Both of these control valve devices are adapted to be located in the cab of a locomotive, and the two pipes 86 and 88 lead to opposite ends of a double check valve 89 which is arranged to control communication between said pipes and the control pipe 9 leading to diaphragm chamber 20 in the throttle control motor 6. When fluid under pressure is supplied to chamber 86 the double check valve 89 will be moved to the position in which it is shown in the drawing for opening said pipe to pipe 9 and for closing communication between said pipes and pipe 88. When fluid under pressure is effective in pipe 88 the double check valve 89 will be moved to an opposite position for opening said pipe to pipe 9 and for closing communication between pipe 86 and pipes 88 and 9.

The hand operated throttle control valve device 85 comprises a casing containing two coaxially aligned and spaced apart flexible diaphragms 91 and 92 of the same areas, which are clamped around their edges in the casing. Between the two diaphragms 91 and 92 is a chamber 93 open through a passage 150 to a fluid pressure supply pipe 94 and thus adapted to be constantly charged with fluid under pressure. At the opposite side of diaphragm 92 is a chamber 95 which is open to atmosphere through a breather port 96, while at the opposite side of diaphragm 91 is a chamber 97. Chamber 97 is connected through a stabilizing choke 98 provided in a wall 100 to a chamber 99. Chamber 99 is open through a passage 213 to the control pipe 86.

Chamber 93 is divided into two parts by a partition wall 101 having an opening 102a providing a constantly open communication between said parts. The partition wall 101 also has a through bore arranged coaxially with respect to the two diaphragms, and slidably mounted in this bore and extending into the two parts of chamber 93 is a stem 102. One end of this stem is connected to the center of diaphragm 92 by follower plates 103 and a clamping nut 104. The opposite end of stem 102 is provided with an enlargement 105 extending through the center of diaphragm 91 and secured thereto by clamping plates 106 and a clamping nut 107 disposed in chamber 97.

The clamping nut 107 has a cylindrical extension 108 slidably mounted in a sleeve 109 arranged coaxially to the two diaphragms and extending through chamber 99 and wall 100. The enlargement 105 of the diaphragm connecting stem 102 has a chamber 110 open through a port 111 to chamber 93 and containing a fluid pressure supply valve 112 having a fluted stem 113 extending through an axial bore in nut 107 into a chamber 114 which is open to the interior of the sleeve and thence through one or more ports 115 in said sleeve to chamber 99. On the end of nut 107 adjacent chamber 110 a seat is provided for the supply valve 112, and a spring 116 contained in said chamber acts on said valve for urging it into contact with its seat.

Slidably mounted in sleeve 109 above the nut extension 108 is a plunger 117 carrying a ring 118 having sealing and sliding contact with the interior surface of said sleeve for preventing leakage of fluid under pressure along said sleeve from chamber 114 formed between the adjacent ends of said plunger and of nut 107. The plunger 117 has an axial bore open to chamber 114 and slidably mounted in this bore is a fluted stem 119 of a fluid pressure release valve 120 contained in said chamber, said valve having a seat on said plunger around the adjacent end of said bore. The release valve 120 and stem 119 are arranged in coaxial relation with the supply valve 112 and its stem 113, and said release valve is urged into contact with the end of the supply valve stem by a spring 121 contained in a bore 122 in said plunger. The upper end of bore 120 is closed by a cap nut 123 which extends into said bore and supports the adjacent end of spring 121. The bore 122 is constantly open to atmosphere through one or more ports 124, a chamber 125 and a vent port 126.

The pressure of spring 121 on the release valve 120 is less than that of spring 116 on the supply valve 112 so that upon movement of plunger 117 in the direction of said supply valve the latter spring will hold the release valve 120 against movement until engaged by said plunger, following which, further movement of said plunger will act through said release valve to open said supply valve, and so that upon movement of said sleeve in the opposite direction spring 116 will seat the supply valve 112 before spring 109 will be able to hold the release valve 120 against movement, whereby plunger 117 may then move out of contact with said release valve.

In chamber 93 a coil regulating spring 127 encircling stem 102 is supported at one end on the wall 101. The opposite end of spring 127 acts on diaphragm 91 against pressure of fluid in chamber 97. With the diaphragm 91 and plunger 117 in the position in which they are shown in the drawing and in which the supply valve 112 is closed and the release valve 120 is open, the regulating spring 127 is adapted to be extended to its free height.

The plunger 117 extends above the upper end of sleeve 109 and encircling this portion of said plunger and supported by the end of the sleeve is a bias spring 130. The opposite end of spring 130 bears against cap nut 123 and is provided for urging the plunger to a position to permit opening of the release valve 120 by spring 121.

An operator's control lever 128 extends through an opening in the casing into chamber 125 wherein it is journaled on the sleeve 109 and supported on a surface 129 in the casing. In chamber 125 the operator's control lever 128 is provided with an upwardly extending cylindrical portion 131 encircling the bias spring 130 and having two oppositely arranged longitudinally extending slots 132. An inverted U-shaped saddle 133 extending over the cap nut 123 has two oppositely arranged legs 134 slidably mounted in slots 132 in the cylindrical portion 131 of lever 128. In the base portion of saddle 133 is a regulating screw 135 engaging the cap nut 123 and secured in an adjusted position by a lock nut 136. Each of the saddle legs 134 has an outwardly extending toe 137 slidably engaging like but oppositely arranged cam surfaces 138 provided on a ring 139 which is secured in the casing.

The operator's control lever 128 has, what may be called for convenience, a normal position in which it is shown in Figs. 1, 3 and 4 of the drawings, this position being provided for causing operation of the throttle control motor 6, in a manner to be presently described, to cut off the supply of steam to pipe 3, and for also permitting control of said motor by operation of the foot operated throttle control valve device 87, control of said motor by said foot operated control valve device being prevented in all other positions of said lever, as will also be later brought out. The operator's control lever 128 also has a full power position indicated in Figs. 3 and 4 of the drawings by a dot-dash line 140 for causing operation of the throttle control motor 6 to move the throttle control device 1 to its fully open or maximum power position, and the distance between the normal position of said lever and the full power position indicated by dot-dash line 140 constitutes a range of adjustment of said lever for varying the supply of steam to pipe 3. At the opposite side of normal position the operator's control lever 128 has a power cut-off insuring position indicated by a dot-dash line 141.

With the operator's control lever 128 in the normal position, the toes 137 on saddle 134 engage portions of the cam surfaces 138 which permit movement of plunger 117 by bias spring 130 to a maximum upward position in which the release valve 120 is unseated from the end of said plunger by spring 121, and the supply valve 112 is closed by spring 116. With the supply valve 112 closed and the release valve 124 open chambers 93 and 97 and thereby the control pipe 86 will be open to atmosphere past said release valve, through the interior of plunger 117 and thence through ports 124, chamber 125 and vent port 126.

If the operator's control lever 128 is moved in a clockwise direction, as viewed in Fig. 3 of the drawing, this movement will turn the saddle 133 relative to ring 139 and the engagement between the saddle toes 137 and the cam surfaces 138 on said ring will move the plunger 117 in the direction of the release valve 120. If this movement of the operator's control lever 117 is sufficient, the plunger 117 will be moved into contact with the release valve 120 and then actuate said release valve to open the supply valve 112 to an extent corresponding to the position of said lever out of its normal position.

Fluid under pressure from the fluid pressure supply pipe 94 will then flow through chamber 93 past the open supply valve 112 to chamber 114 and thence through ports 115 to chamber 99 and to the control pipe 86. As fluid under pressure is thus supplied to chamber 99 it will also flow through the stabilizing choke 98 into chamber 97 and therein act on diaphragm 91 in opposition to pressure of regulating spring 127. When the pressure of fluid thus obtained in chamber 97 and in the control pipe 86 is increased to a degree sufficient to overcome the force of spring 127, the diaphragm 91 will deflect against said spring in the direction of the supply valve 112. Assuming that movement of the operator's control lever 128 from its normal position has been limited to less than the maximum degree, the suppply valve 112 will be stationary, so that movement of diaphragm 91 by the increasing pressure of fluid in chamber 97 will be relative to said valve until the nut 107 is moved into contact with said valve to prevent further flow of fluid under pressure to said chamber and to the control pipe 86. When the supply of fluid under pressure to the control pipe 86 and to chamber 97 is thus cut off movement of diaphragm 91 will cease, since the increased pressure of spring 127 will counterbalance the pressure of fluid in said chamber, whereby the pressure of fluid in said chamber and in the control pipe 86 will be limited in accordance with the position of the supply valve 112 as defined by the extent of movement of the operator's control lever 128 from its normal position.

If the operator desires to increase the pressure of fluid in the control pipe 86 he will move lever 128 further in the direction of the position indicated by the dot-dash line 140 for thereby again unseating the supply valve 112. Fluid under pressure will then again be supplied past the supply valve 112 to the control pipe 86 and diaphragm chamber 97, and the diaphragm 91 will again deflect against spring 127 until it seats against supply valve 112 for limiting the pressure of fluid in the control pipe 86 in accordance with the new position of the operator's control lever 128.

If the operator's control lever is moved to the full power position indicated by the dot-dash line 140, the supply valve 112 will be displaced in a downwardly direction to a maximum degree, and the control valve device will function in the same manner as just described to supply fluid under pressure to pipe 86 until such pressure effective in chamber 97 becomes increased to a degree sufficient to deflect diaphragm 91 to an extent required to again close said supply valve. It will thus be seen that by suitable adjustment of the operator's control lever 117 out of its normal position in the direction of and to the full power position indicated by dot-dash line 140, any desired pressure of fluid up to and including a maximum may be provided in the control pipe 86.

Assuming that the control pipe 86 is charged with fluid under pressure as just described and the operator desires to reduce the pressure of such fluid, he will move the control lever 129 back in the direction of its normal position, whereupon the position of the saddle toes 137 with respect to the cam surfaces 138 will be so changed as to permit bias spring 130 to move the plunger 117 in a direction away from the supply valve 112. With the supply valve 112 seated spring 121 will hold the release valve 120 against movement with plunger 117 so that said release valve will be unseated and open chambers 99 and 97 and the control pipe 86 to atmosphere. Fluid under pressure will then be released from chambers 99 and 97 and from the control pipe 86, and as the pressure of fluid in chamber 97 reduces the regulating spring 127 will move the diaphragm 91 in an upwardly direction, and spring 116 acting on the supply valve 112 will move said valve and the release valve 120 with said diaphragm.

Assuming that the operator's control lever 128 is still out of its normal position and movement of the plunger 117 in an upwardly direction is limited to a degree less than to its normal position, this movement of diaphragm 91 by spring 127 and thereby of the supply valve 112 and release valve 120 by spring 116 will be relative to said plunger until said release valve moves into seating engagement with said plunger for preventing further release of fluid under pressure from pipe 86 and chambers 99 and 97. Movement of diaphragm 91 will then cease since the pressure of fluid remaining in chamber 97 and effective in the control pipe 86 counterbalances the reduced pressure of spring 127. It will thus be seen that the pressure of fluid in the control pipe 86 will be reduced only to a degree corresponding to the change in position of the operator's control lever 117.

If the lever 128 is moved further towards but not to its normal position the structure will again operate as just described to cause a corresponding reduction in the pressure of fluid in pipe 86, while if lever 128 is returned to its normal position, in which it is shown in the drawing, the plunger 117 will be moved to such a position as to prevent closure of the release valve 120 at the time the spring 127 becomes extended to its free height. Under this latter condition the release valve 120 will therefore remain open so as to completely vent fluid under pressure from the control pipe 86.

It will thus be seen that any selected pressure between atmospheric pressure and a chosen maximum degree may be provided in the control pipe 86 by suitable adjustment of the operator's control lever 128 in and between its normal position and its full power position indicated by the dot and dash line 140, respectively. It will further be apparent that when the double check valve 89 is in the position shown in the drawing opening communication between the control pipe 86 and the control pipe 9 for the throttle control motor 6, the throttle valve device 1 will be operated to cut off the supply of steam to pipe 3 when the operator's control lever 128 is in its normal position, and will be operated to its fully open position indicated by the dot-dash line 5 when the operator's control lever 128 is moved to its full power position indicated by the dot-dash line 140, while upon movement of said lever to any intermediate position the throttle valve device 1 will be correspondingly positioned so as to limit the amount of steam supplied to pipe 3 in accordance with the position of the operator's control lever.

The operator's hand operated throttle control valve device 85 further comprises a cut-off valve device 142. The cut-off valve device 142 comprises a supply valve 143 contained in a chamber 144 to which the cut-off pipe 15 is open. The supply valve 143 is carried on the end of a stem 145 projecting from a sleeve 146 which is slidably mounted in a bore in the casing. Between the sleeve 146 and the supply valve 143 and encircling the stem 145 is an annular chamber 147 which is open through a port 148 and another annular chamber 149 to passage 150 which is connected to the fluid pressure supply pipe 94 whereby the annular chamber 147 is adapted to be constantly supplied with fluid under pressure.

A spring 151 contained in chamber 144 acts on the supply valve 143 for urging it to a closed position in which it is shown in the drawing. The sleeve 146, stem 145 and supply valve 143 are provided with a through bore 152 one end of which is open to chamber 144. The opposite end of bore 152 opens through sleeve 146 to a chamber 153 containing a release valve 154 which is arranged to seat against the end of said sleeve for closing communication through said bore. Chamber 153 is open through a port 155 to chamber 125 which is open to atmosphere. A plunger 156 slidably mounted in a suitable bore in the casing extends into chamber 153 and therein is provided with a head 157 for engaging the release valve 154. The opposite end of plunger 156 is disposed for engagement by a cam 158 (Fig. 4) on the operator's control lever 128 when said lever is in its normal position.

When the cam 158 is moved into contact with plunger 156 it will move said plunger in the direction of the right hand as viewed in Fig. 1 to first move the release valve 154 into contact with the end of sleeve 146 and to then actuate said sleeve to open the supply valve 143. When the cam 158 is moved out from under the plunger 156, the supply valve 143 will be closed by spring 151 and the release valve 154 will be free to open.

The cam 158 is arranged to close the release valve 154 and open the supply valve 143 only in the power off insuring position of the operator's control lever 128, indicated by the dot-dash line 141, for thereby supplying fluid under pressure to the cut-off pipe 15 and thence to spring chamber 12 in the throttle control motor 6 to insure movement of the power piston 12 to the position in which it is shown in Fig. 5 for actuating the throttle valve device 1 to cut off the supply of steam to pipe 3. Even if fluid under pressure is effective in chamber 17 on the right hand side of the power piston 10 at this time the provision of fluid in chamber 12 at an equal pressure will, with spring 16 effective, permit said spring to move the power piston 10 to its cut-off position for actuating the throttle control valve 1 to cut off the supply of steam to pipe 3, as will be apparent.

When the operator's control lever 128 is in any position out of the power cut-off ensuring position the cam 158 will be moved out from under plunger 156 to permit closing of the supply valve 143 by spring 151 and opening of the release valve 154 by pressure of fluid from the cut-off pipe 15, so that the spring chamber 12 in the throttle adjusting motor 6 will be open to atmosphere to permit operation of said motor to adjust the throttle control valve device 1 as above described.

The foot operated throttle control valve device 87 comprises a casing containing a flexible diaphragm 160 clamped therein around its edge. At one side of diaphragm 160 is a chamber 161 open to atmosphere through a port 162 and containing a regulating spring 163 bearing against a follower plate 164 mounted against the adjacent face of said diaphragm. At the opposite side of diaphragm 160 is a control chamber 165 and opening to this chamber is a bore arranged in coaxial relation with the diaphragm 160. Slidably mounted in this bore adjacent the diaphragm chamber 165 is a sleeve like extension 166 of a follower plate 167 engaging the adjacent face of diaphragm 160. The plate 167 is provided centrally with a stem 168 extending through the diaphragm 160 and the follower plate 164, and in chamber 161 a nut 169 is provided on said stem for clamping the diaphragm between the two plates.

Above the extension 166 of follower plate 167 is a plunger 170 slidably mounted in the casing, and between the adjacent ends of said extension and plunger is a chamber 171 which is open to the control pipe 88 and also through a choke 172 to diaphragm chamber 165.

The diaphragm follower stem 168 and extension 166 are provided with an axial bore one end of which is open to chamber 161 while the opposite end is open through a valve seat to chamber 171, a release valve 173 being provided in the latter chamber for cooperation with said seat for closing communication between chambers 171 and 161.

The plunger 170 has a chamber 174 containing a fluid pressure supply valve 175 arranged to control communication between said chamber and an axial bore 176 which opens to chamber 171. A spring 177 in chamber 174 acts on the supply valve 175 for urging it to its seat. The supply valve 175 and release valve 173 are connected together for a movement in unison by a pin 192. The chamber 174 is open through a port 178 to a chamber 179 provided around the plunger 170 and which annular chamber is open to a fluid pressure supply pipe 180. At either side of the annular chamber 179 the plunger has a sealing ring 181 slidably contacting the wall of the bore in which said plunger is mounted for preventing leakage of fluid under pressure from said chamber.

The upper end of plunger 170 engages one side of one end of a follower arm 183 the opposite end of which is pivotally mounted on a pin 184 in the casing. Engaging the follower arm 183 opposite to plunger 170 is a lug 185 projecting from a foot lever or pedal 186 which is hinged on a fulcrum pin 187 carried by a bracket 190. At one side of the fulcrum pin 187 a spring 188 acts on the pedal 186 for urging it to an extreme upper position defined by contact between a button 189 at the opposite side of fulcrum pin 187 and the bracket 190.

With the foot pedal 186 in its uppermost position as shown in the drawing, a bias spring 191 contained in chamber 171 and supported at one end on the follower plate 167 acts on plunger 170 to hold it in an uppermost position in contact with one side of the follower arm 183 and urging said arm into contact with lug 185, said spring being rendered effective to act as just described by the follower plate 167 when in contact with a stop 194 in the casing. The follower plate 167 will be moved into engagement with stop 194 by regulating spring 163 when the pressure of fluid in chamber 165 and in the control pipe 88 is substantially that of the atmosphere. With the parts disposed as just described, spring 177 will seat the supply valve 175, and the release valve 173 will be just seated or slightly unseated from its seat on a follower plate 167.

In operation, let it be assumed that the supply pipe 180 and supply valve chamber 174 are supplied with fluid under pressure. If the pedal 186 is now depressed it will act through lug 185 to move plunger 170 in a downward direction against the opposing force of bias spring 191, which force is less than that of the regulating spring 163. If the release valve 173 is initially open said valve will be moved by the pressure of spring 177 on the supply valve 175 until it becomes seated against the follower 167, following which, it will be held against movement by the regulating spring 163 so that further movement of plunger 170 in a downward direction will then be relative to said valve and also to the supply valve 175 which will be held against movement by stem 192. As a result, the plunger 170 will move out of seating engagement with the supply valve 175 and fluid under pressure will then flow from chamber 174 past said valve to chamber 171 and thence to the control pipe 88 leading to the double check valve 89.

At the same time as fluid under pressure is supplied to the control pipe 88 as just described, it will also equalize through the stabilizing choke 172 into diaphragm chamber 165, and when said pressure becomes sufficient to overcome the opposing force of regulating spring 163 on the diaphragm 160, said diaphragm will deflect against said spring. Assuming that movement of the pedal 186 from its normal position is limited to some chosen degree, movement of the plunger 170 will stop in a corresponding position. Deflection of diaphragm 160 by increasing pressure of fluid in the control pipe 88 and in diaphragm chamber 165 will then permit movement of the seated release valve 173 and of the open supply valve 175 by spring 177 along with said diaphragm and relative to said plunger until said supply valve contacts its seat on said plunger. With the supply valve 175 seated further flow of fluid under pressure to the control pipe 88 and to diaphragm chamber 165 will be prevented whereupon movement of the diaphragm 160 will cease. The pressure of fluid thus obtained in the control pipe 88 will therefore depend upon and be proportional to the extent of movement of the control pedal 186 out of its normal position, in which it is shown in the drawing.

If the operator depresses the pedal 186 to a greater degree the pressure of fluid in the control pipe 88 will be increased correspondingly by operation of the valve device 87 in the same manner as just described. On the other hand, if the operator permits pedal 186 to be moved back toward but not to its normal position by spring 188 the pressure of fluid in the control pipe 88 acting in chamber 171 on plunger 170, plus the pressure of bias spring 191, will move the plunger 170 along with the pedal 186. As a result, the release valve 173 will be pulled away from its seat on follower plate 167 by the seated supply valve 175 acting through the stem 192, so that fluid under pressure will be released from the control pipe 88 past said valve to chamber 161 and thence to atmosphere through port 162. The pressure of fluid in diaphragm chamber 165 will reduce with that in the control pipe 88 and, as a result, the regulating spring 163 will deflect the diaphragm 160 in an upward direction. Now assuming that movement of the pedal 186 and plunger 170 have ceased, this movement of diaphragm 160 will be relative to and in the direction of the open release valve 173, and the follower 167 will finally move into seating contact with said valve in a position of the diaphragm 160 corresponding to that of the foot pedal 186 for preventing further release of fluid under pressure from the control pipe 88. The pressure of fluid in the control pipe 88 will therefore be again limited to a degree corresponding to the position of the pedal 186. If the foot pedal 186 is permitted to return further toward its normal position the pressure of fluid in the control pipe 88 will be correspondingly reduced as will be apparent, while in case said pedal is returned fully to its normal position, in which it is shown in the drawing, the diaphragm follower 167 will move into contact with stop 194 after the pressure of fluid in the control pipe 88 has been reduced to substantially atmospheric pressure. When the diaphragm follower 167 thus contacts stop 194 the release valve 173 may still be slightly open or just closed.

It will now be seen that when the foot pedal 186 is in its normal position in which position the control pipe 88 will be at substantially atmospheric pressure, the double check valve 89 is capable of movement to its upper position by pressure of fluid supplied to pipe 86 so as to permit control of the throttle control motor 6 and thereby the throttle valve device 1 to regulate the supply of steam to pipe 3 by operation of the hand operated throttle control valve device 85. It will also be noted that when the hand operated throttle control valve device 85 is in its normal position in which it is shown in Figs. 1, 2 and 3 of the drawings, opening the control pipe 86 to atmosphere, the double check valve 89 is capable of movement to its lower position under pressure of fluid supplied to the control pipe 88, so that operation of the throttle control motor 6 to regulate the throttle valve device 1 can be controlled by the foot operated throttle control valve device 87, when fluid under pressure is supplied to pipe 180.

According to the present form of the invention, the supply of fluid under pressure to pipe 180 leading to the foot operated throttle control valve device 87 is controlled through an interlock valve device 195 which in turn is controlled by the hand operated throttle control valve device 85 so as to prevent supply of fluid under pressure to pipe 88 by operation of the foot operated throttle control valve device 87 for controlling the throttle valve device 1, when the hand operated throttle control valve device 85 is being operated to control said throttle valve device.

The interlock valve device 195 is structurally identical to the cut-off valve device 142 in that it comprises a supply valve 196 contained in a chamber 197 to which the fluid pressure supply pipe 180 is connected. The supply valve 196 is carried by a stem 196a of smaller diameter than and projecting from a sleeve 198 which is slidably mounted in a bore in a bushing 202 secured in the casing. Between the sleeve 198 and valve 196 and encircling the stem 196a is an annular chamber 199 which is constantly supplied with fluid under pressure from the supply pipe 94 through the annular chamber 149, a port 200, an annular chamber 201 encircling bushing 202 and thence through one or more ports 203. Extending through the sleeve 198, the stem 196a and the supply valve 196 is an axial bore 204 which is open at one end to the supply valve chamber 197, while its opposite end is open through a valve seat to a chamber 205 containing a fluid pressure release valve 206 arranged to contact said seat for closing communication through said bore. Chamber 205 is open through a port 207 to chamber 125 and thence to atmosphere through port 126. A plunger 208 slidably mounted in a suitable bore through the outer end wall of chamber 205 extends into said chamber and therein is provided with a head 210 which engages the release valve 206. The opposite end of plunger 208 is arranged to be engaged by a raised portion or cam 211, provided on the operator's control lever 128, preferably only when said lever is in its normal position.

Engagement of cam 211 with plunger 208 will seat the release valve 206 against the end of sleeve 198 and then actuate said sleeve and stem 196a to open the supply valve 196 for thereby supplying fluid under pressure to pipe 180 leading to the operator's foot control valve device 87. In all other positions of lever 128 of the hand operated throttle control valve device 85, the cam 211 will be out of contact with plunger 208 to permit seating of valve 196 by a spring 212 contained in chamber 197 for thereby cutting off supply of fluid under pressure to pipe 180. With the supply valve 196 seated pressure of fluid in pipe 180 will then blow the release valve 206 from its seat for releasing any fluid which may be in said pipe.

It will thus be seen that when the hand operated throttle control valve device 85 is in its normal position opening pipe 86 to atmosphere, the interlock valve device 195 will be operated to supply fluid under pressure from the fluid pressure supply pipe 94 to the supply pipe 180 leading to the foot controlled throttle valve device 87 for rendering said foot controlled valve device effective to control operation of the throttle control motor 6 and thereby of the throttle valve device 1 for regulating the supply of steam to pipe 3. However, when the operator's control lever 128 is in any position other than its normal position, the supply of fluid under pressure to pipe 180 will be cut off and said pipe will be open to atmosphere, so that the foot operated throttle control valve device 87 will be prevented from controlling operation of the throttle control motor 6 and throttle valve device 1. Thus, when the throttle valve device 1 is being controlled by the hand operated throttle control valve device 85, there can be no interference with such control from the foot operated throttle control valve device 87.

*Description Figs. 6 and 7*

According to this modification, the exhaust port 207 from valve chamber 205 in the interlock valve device 195 is omitted. Pipe 88 is disconnected from passage 213 and connected to valve chamber 205. Port 200 is omitted and the annular cavity 201 in the interlock valve device 195 is connected to passage 213 leading to chamber 99. The control pipe 86 from the hand operated throttle control valve device 85 and the double check valve 89 are omitted and pipe 9 from the throttle adjusting motor 6 is connected to valve chamber 197 in the interlock valve device 195. A bias spring 217 is provided in sleeve 198 to act on and unseat the valve 206. The operator's control lever 128 is provided with a cam surface 214 for operating plunger 208 to close valve 206 and to open valve 196 when said lever is moved out of its normal position in the direction of the full power position indicated by the dot-dash line 141 and to also preferably provide through the medium of a surface 215 the same condition of said valves with said lever in the power cut-off insuring position. The surfaces 214 and 215 are connected by a recess 216 which in the normal position of the operator's control lever 128 is adapted to receive plunger 208 to permit opening of valve 206 by spring 217 and closing of valve 196 by spring 212.

It will thus be seen that with the operator's control lever 128 in its normal position communication will be established between the control pipe 88 from the foot operated throttle control device 87 and pipe 9 leading to the throttle control motor 6 past the open valve 206 and thence through bore 204 and the supply valve chamber 197, to permit control of a throttle adjusting motor 6 by operation of the foot operated control valve device 87. However, where the operator's control lever 128 is moved out of its normal position effecting closure of valve 206 and opening of valve 196, the closing of valve 206 will render the foot operated throttle control valve device 87 ineffective to control the throttle adjusting motor 6, while opening of valve 196 connects pipe 9 to passage 213 and thereby diaphragm chamber 99 for rendering the hand operated throttle control valve device effective to control said motor.

It will now be seen that in the structure shown in Figs. 1 to 5 of the drawings the foot operated throttle control valve device 85 is rendered effective for controlling the throttle adjusting motor 6 by supplying fluid under pressure thereto through the cut-off valve device 195 of the hand operated throttle control valve device 87, while upon movement of the control lever 128 out of its normal position this supply to the foot operated throttle control valve device is cut-off to render the latter device ineffective. In contrast to this structure, the structure shown in Figs. 6 and 7 of the drawings accomplishes the same end by intercepting the control passage 88 from the foot controlled throttle control valve device 87.

*Summary*

From the above description it will now be seen that the improved throttle control apparatus provides for control of a throttle for a prime mover from either of two different control stations, and that interlock means associated with the control means at one of said stations is operable to render the control means at the other station either effective or ineffective, depending upon the position of the control means at the one station. By this arrangement when the throttle is being controlled by the control means at the one station there can be no interference with such control by the control means at the other station, since, in one case, the supply of fluid under pressure to the control means at the oher station is cut off, and in the other case the control pipe from the last named control means is intercepted when the throttle is being controlled from the control means at the one station.

Having now described my invention, what I claim as new and desire to secure by Letters Patent, is:

1. An engine throttle control apparatus comprising in combination, a fluid pressure adjustable throttle control motor, two operator's control devices individually operative to control a communication for supplying fluid under pressure to said motor to adjust same, a valve controlling the communication controlled by one of said control devices, the other control device comprising a lever having a power off position and a power on position, means controlled by said lever operable in said power on position to actuate said valve to close the respective communication and in said power off position to effect operation of said valve to open the respective communication, and another valve for closing communication between said other control device and motor when the first named valve is opening the respective communication.

2. An engine throttle control apparatus comprising in combination, a fluid pressure adjustable throttle control motor, two operator's control devices individually operative to control a communication for supplying fluid under pressure to said motor to effect adjustment thereof, valve means having one position for opening the communication controlled by one of said control devices to said motor and for closing the communication controlled by the other control device to said motor and having a second position for opening the communication controlled by said other control device to said motor and for closing the communication controlled by said one control device to said motor, said one control device comprising a lever having a power on position and a power off position, a cam on said lever operable in said power on position to move said valve means to said one position, and means operable in said power off position to move said valve means to its said second position.

3. An engine throttle control apparatus comprising in combination, a fluid pressure adjustable throttle control motor, a source of fluid under pressure, two operator's control devices individually operative to establish a communication between said source of fluid under pressure and said motor for supplying fluid under pressure to said motor, valve means operable, upon operation of one of said control devices to establish the respective communication, to close communication between said source and the other control device, and other valve means operable upon supply of fluid under pressure to said motor by operation of either one of said control devices to close communication between said motor and the other control device.

4. An engine throttle control apparatus comprising in combination, a fluid pressure adjustable throttle control motor, a source of fluid under pressure, a first operator's control device operable to supply fluid under pressure from said source to said motor and to release fluid under pressure from said motor to adjust same, a second operator's control device operable to supply fluid under pressure to and to release fluid under pressure from said motor to adjust same, interlock means controlling supply of fluid under pressure from said source to said first operator's control device for supply to said motor by operation of said first operator's control device, and means operable by said second operator's control device upon operation thereof to supply fluid under pressure to said motor to effect operation of said interlock means to close communication between said source and first operator's control device to prevent supply of fluid under pressure to said motor by operation of said first operator's control device.

5. An engine throttle control apparatus comprising in combination, a fluid pressure adjustable throttle control motor, two operator's control devices individually operative to supply fluid under pressure to and to release fluid under pressure from said motor, a double check valve interposed in the fluid pressure supply and release communications between said operator's control devices and said motor and operable upon supply of fluid under pressure by either one of said control devices to open the communication therebetween and said motor and to close the communication between said motor and the other control device, and interlock means controlled by one of said control devices and operable upon operation thereof to supply fluid under pressure to said motor to prevent supply of fluid under pressure to said motor by operation of the other control device.

6. An engine throttle control apparatus comprising in combination, a fluid pressure adjustable throttle control motor, two operator's control devices each comprising a lever having a power on position and a power off position and valve means operable by said lever in said power on position to supply fluid under pressure to said motor and in said power off position to release fluid under pressure from said motor, a valve controlling the fluid pressure supply communication to said motor controlled by one of said control devices, and having an open and a closed position for, respectively, opening and closing said communication, and means including a cam on the lever of the other control device operable with the lever in its power on position to move said valve to its closed position and in its power off position to effect movement of said valve to its open position.

7. An engine throttle control apparatus comprising in combination, a throttle control motor comprising a casing, a fluid pressure adjustable piston in said casing subject to pressures of fluid in a first chamber at one side of said piston and in a second chamber at the opposite side, a first operator's control device comprising a lever having a normal position, a power on position at one side of said normal position and a power off position at the opposite side of said normal position and valve means operable by said lever in said power on position to effect a supply of fluid under pressure to said first chamber, and a release fluid under pressure from said second chamber, in said power off position to effect a supply of fluid under pressure to said second chamber and a release fluid under pressure from said first chamber, and in said normal position to effect a release fluid under pressure from both of said chambers, a second operator's control device for effecting a supply of fluid under pressure to said first chamber, valve means controlling the fluid pressure supply communication to said first chamber by way of said second operator's control device, and means including a cam on said lever operable to actuate said valve means to close the respective communication with said lever out of said normal position and to open the respective communication with said lever in said normal position.

8. An engine throttle control apparatus comprising in combination, a throttle adjusting motor comprising a casing, a fluid pressure adjustable piston in said casing subject to pressures of fluid in a first chamber at one side of said piston and in a second chamber at the opposite side, a first operator's control device comprising a lever having a normal position, a power-on position at one side of said normal position and a power-off position at the opposite side of said normal position, a first valve means controlled by said lever and operable in said power-on position to effect supply of fluid under pressure to said first chamber and operable in said normal and power-off position to effect opening of said first chamber to a fluid pressure release communication, and a second valve means controlled by said lever and operable in said power-off position to effect supply of fluid under pressure to said second chamber and operable in said normal and power-on positions to effect opening of said second chamber to a fluid pressure release communication, a second operator's control device for effecting supply and release of fluid under pressure to and from said first chamber, and interlock means controlled by said lever operable in said normal position to render said second operator's control device effective to effect supply and release of fluid under pressure to and from said first chamber and operable in said power-on and power-off positions to render said second operator's control device ineffective to effect supply and release of fluid under pressure to and from said first chamber.

SIDNEY G. DOWN.

REFERENCES CITED

The following references are of record in the file of this patent:

UNITED STATES PATENTS

| Number | Name | Date |
| --- | --- | --- |
| 1,806,669 | Campbell | May 26, 1931 |
| 1,943,586 | Dapron | Jan. 16, 1934 |